United States Patent
Huang et al.

(10) Patent No.: US 11,755,911 B2
(45) Date of Patent: Sep. 12, 2023

(54) METHOD AND APPARATUS FOR TRAINING NEURAL NETWORK AND COMPUTER SERVER

(71) Applicant: BEIJING TUSEN ZHITU TECHNOLOGY CO., LTD., Beijing (CN)

(72) Inventors: Zehao Huang, Beijing (CN); Naiyan Wang, Beijing (CN)

(73) Assignee: BEIJING TUSEN ZHITU TECHNOLOGY CO., LTD., Beijing (CN)

( * ) Notice: Subject to any disclaimer, the term of this patent is extended or adjusted under 35 U.S.C. 154(b) by 1091 days.

(21) Appl. No.: 16/421,259

(22) Filed: May 23, 2019

(65) Prior Publication Data

US 2019/0385059 A1 Dec. 19, 2019

(30) Foreign Application Priority Data

May 23, 2018 (CN) .......................... 201810498650.1

(51) Int. Cl.
*G06N 3/08* (2023.01)
*G06N 3/082* (2023.01)
(Continued)

(52) U.S. Cl.
CPC ........... *G06N 3/082* (2013.01); *G06F 18/214* (2023.01); *G06N 3/048* (2023.01); *G06V 10/774* (2022.01); *G06V 10/82* (2022.01)

(58) Field of Classification Search
CPC .... G06K 9/6256; G06V 10/82; G06V 10/774; G06N 3/0454; G06N 3/0481; G06N 3/082; G06N 3/045; G06N 3/048; G06F 18/214

See application file for complete search history.

(56) References Cited

U.S. PATENT DOCUMENTS

| 9,342,759 B1* | 5/2016 | Chen ........................ G06T 7/248 |
| 2018/0144241 A1* | 5/2018 | Liu ........................ G06N 3/0454 |
| 2020/0320344 A1* | 10/2020 | Ma ........................ G06N 3/0454 |

FOREIGN PATENT DOCUMENTS

| CN | 107247991 A | 10/2017 |
| CN | 107491790 A | 12/2017 |

OTHER PUBLICATIONS

Huang et al., "Data-Driven Sparse Structure Selection for Deep Neural Networks", Dec. 18, 2017, arXiv:1707.01213v2, pp. 1-9 (Year: 2017).*

(Continued)

*Primary Examiner* — Brent Johnston Hoover
(74) *Attorney, Agent, or Firm* — Perkins Coie LLP (57) ABSTRACT

The present disclosure provides a method and an apparatus for training a neural network and a computer server. The method includes: selecting automatically input data for which processing by the neural network fails, to obtain a set of data to be annotated; annotating the set of data to be annotated to obtain a new set of annotated data; acquiring a set of newly added annotated data containing the new set of annotated data, and determining a union of the set of newly added annotated data and a set of training sample data for training the neural network in a previous period as a set of training sample data for a current period; and training the neural network iteratively based on the set of training sample data for the current period, to obtain a neural network trained in the current period.

18 Claims, 8 Drawing Sheets

(51) Int. Cl.
*G06F 18/214* (2023.01)
*G06N 3/048* (2023.01)
*G06V 10/774* (2022.01)
*G06V 10/82* (2022.01)

(56) References Cited

OTHER PUBLICATIONS

Srinivas et al., "Training Sparse Neural Networks", Nov. 21, 2016, arXiv:1611.06694v1, pp. 1-7. (Year: 2016).*
CNIPA Third Office Action, Chinese Patent Application No. 201810498650.1, dated May 18, 2020.

* cited by examiner

METHOD AND APPARATUS FOR TRAINING NEURAL NETWORK AND COMPUTER SERVER

CROSS-REFERENCE TO RELATED APPLICATIONS

This patent document claims priority to and benefits of Chinese Application Number 201810498650.1 of the same title and content that was filed on May 23, 2018. The entire contents of the aforementioned patent application are incorporated by reference as part of the disclosure of this patent document.

TECHNICAL FIELD

The present disclosure relates to deep learning technology, and more particularly, to a method for training a neural network, an apparatus for training a neural network and a computer server.

BACKGROUND

In recent years, deep neural networks have achieved tremendous success in many fields including computer vision, natural language processing, etc. However, a deep neural network needs to meet the following three conditions in order to be applied in actual applications: 1) it meets speed requirements of the actual applications; 2) it is trained over a large amount of actual scenario data; and 3) it can be updated iteratively and quickly depending on actual requirements.

When a neural network is applied in practice, a researcher or developer may initiate retraining of the neural network when he/she finds that the processing by the neural network is not optimal. The researcher or developer may manually obtain a set of sample data for retraining the neural network and retrain the neural network based on the set of sample data. The entire retraining process requires human involvement.

SUMMARY

According to some embodiments of the present disclosure, a method for training a neural network is provided. The method includes the following process performed at a predetermined time period: selecting automatically input data for which processing by the neural network fails, to obtain a set of data to be annotated; annotating the set of data to be annotated to obtain a new set of annotated data; acquiring a set of newly added annotated data containing the new set of annotated data, and determining a union of the set of newly added annotated data and a set of training sample data for training the neural network in a previous period as a set of training sample data for a current period; and training the neural network iteratively based on the set of training sample data for the current period, to obtain a neural network trained in the current period.

According to some embodiments of the present disclosure, an apparatus for training a neural network is provided. The apparatus includes: a control unit configured to trigger a selecting unit, a annotating unit, an acquiring unit and a training unit at a predetermined time period; the selecting unit configured to select automatically input data for which processing by the neural network fails, to obtain a set of data to be annotated; the annotating unit configured to annotate the set of data to be annotated to obtain a new set of annotated data; the acquiring unit configured to acquire a set of newly added annotated data containing the new set of annotated data, and determine a union of the set of newly added annotated data and a set of training sample data for training the neural network in a previous period as a set of training sample data for a current period; and the training unit configured to train the neural network iteratively based on the set of training sample data for the current period, to obtain a neural network trained in the current period.

According to some embodiments of the present disclosure, a computer server is provided. The computer server includes a memory and one or more processors communicatively connected to the memory. The memory stores instructions executable by the one or more processors. The instructions, when executed by the one or more processors, cause the one or more processors to perform the method according to the above first aspect.

BRIEF DESCRIPTION OF THE DRAWINGS

The figures are provided for facilitating further understanding of the present disclosure. The figures constitute a portion of the description and can be used in combination with the embodiments of the present disclosure to interpret, rather than limiting, the present disclosure. In the figures.

DETAILED DESCRIPTION OF THE EMBODIMENTS

In the following, the solutions according to the embodiments of the present disclosure will be described clearly and completely with reference to the figures, such that the solutions can be better understood by those skilled in the art. Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

With the solutions according to the present disclosure, after a neural network has been applied in practice, input data for which processing by the neural network fails may be detected automatically and annotated to obtain a new set of annotated data. A set of newly added annotated data containing the new set of annotated data may be acquired and added to a set of training sample data for training the neural network in a previous period, so as to continuously enrich the set of training sample data for training the neural network, such that the set of training sample data may include more and more training sample data. The neural network may be trained iteratively and automatically based on the enriched set of training sample data, so as to continuously improve the accuracy of the neural network. With the solutions according to the present disclosure, the entire process of selecting the data to be annotated, annotating the data, automatically updating the set of training sample data and automatically training the neural network may be automatized without human intervention. The set of training sample data for training the neural network may be automatically enriched and the neural network may be trained automatically based on the enriched set of training sample data, so as to continuously improve the accuracy of the neural network.

The solutions according to the embodiments of the present disclosure can be applied to any neural network having any structure and achieving any function. The present disclosure is not limited to any specific structure of the neural network or any specific function it is to achieve. For example, the neural network in the embodiments of the present disclosure may be a neural network achieving functions such as image segmentation, object detection, face recognition, natural language processing, etc.

Embodiment 1

Figure 1:
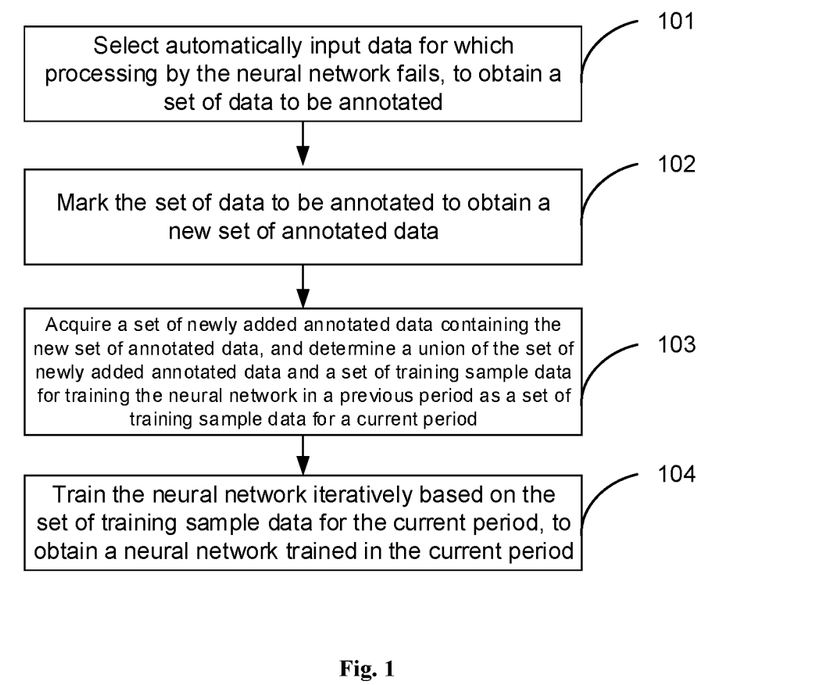
FIG. 1 is a first flowchart illustrating a method for training a neural network according to some embodiments of the present disclosure.

Referring to FIG. 1, which is a flowchart illustrating a method for training a neural network according to some embodiments of the present disclosure, the method includes steps 101~104.

At step 101, input data for which processing by the neural network fails is selected automatically, to obtain a set of data to be annotated.

At step 102, the set of data to be annotated is annotated to obtain a new set of annotated data.

At step 103, a set of newly added annotated data containing the new set of annotated data is acquired, and a union of the set of newly added annotated data and a set of training sample data for training the neural network in a previous period is determined as a set of training sample data for a current period.

At step 104, the neural network is trained iteratively based on the set of training sample data for the current period, to obtain a neural network trained in the current period.

Figure 2:
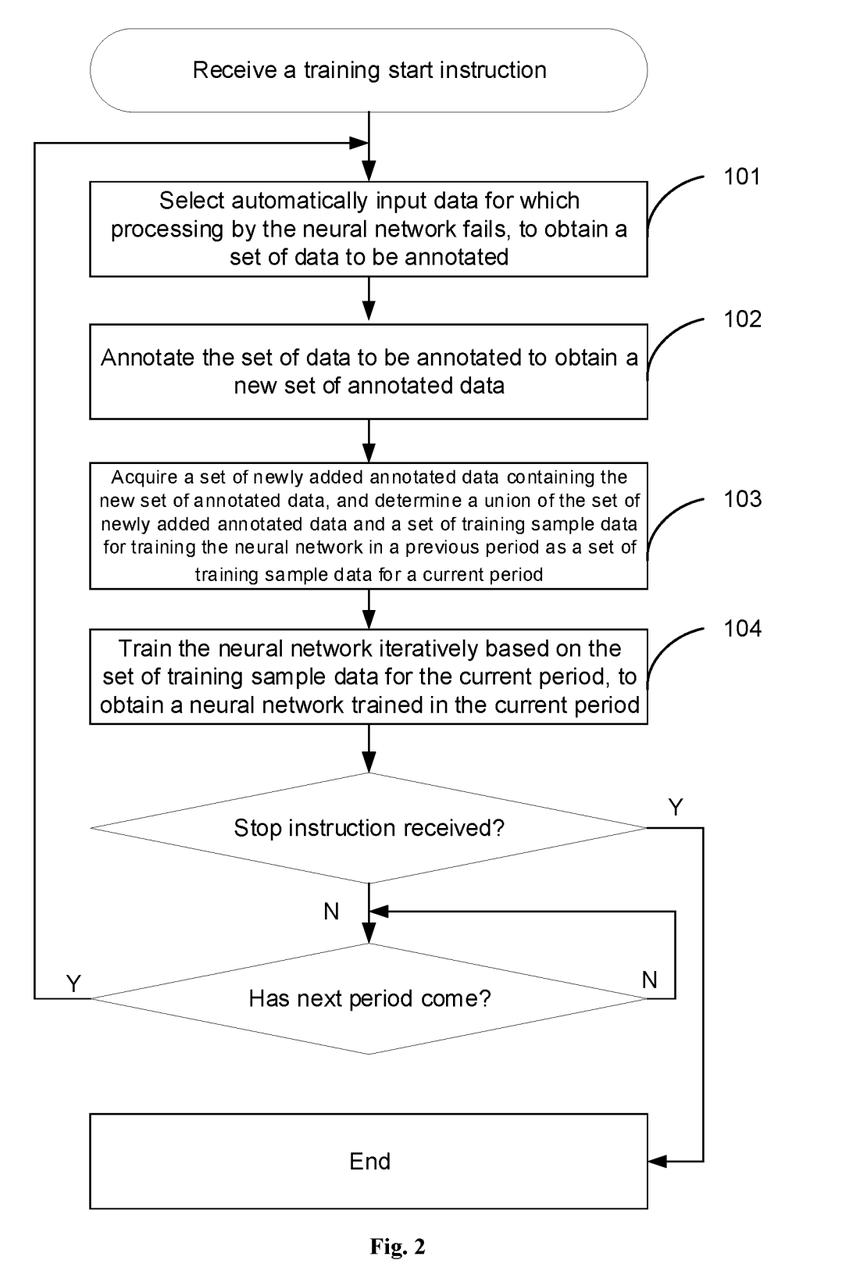
FIG. 2 is a second flowchart illustrating a method for training a neural network according to some embodiments of the present disclosure.

In some embodiments of the present disclosure, in order to improve the controllability of the automatic training of the neural network, the above process shown in FIG. 1 may include performing the above steps 101~104 periodically at a predetermined time period in response to receiving an automatic training start instruction, and may be stopped in response to receiving an automatic training stop instruction, as shown in FIG. 2. In some embodiments of the present disclosure, the automatic training start instruction and the automatic training stop instruction may be entered manually or may be generated automatically by predetermined program codes in accordance with a predefined triggering condition (e.g., automatic training start time and automatic training stop time), and the present disclosure is not limited to either of these cases.

In some examples, the above step 102 may be, but not limited to be, implemented in any of the following schemes.

Scheme A1: The set of data to be annotated may be transmitted to an annotation platform, which may annotate the data in the set of data to be annotated to obtain the new set of annotated data.

In Scheme A1, the set of data to be annotated may be transmitted to the annotation platform in any of the following schemes, as non-limiting examples.

Scheme A11: The set of data to be annotated may be transmitted directly to the annotation platform.

Scheme A12: The set of data to be annotated may be stored in a predetermined storage space (which may be dedicated to storing sets of data to be annotated by the annotation platform) and the annotation platform may retrieve the set of data to be annotated from the storage space.

Scheme A2: The set of data to be annotated may be annotated manually to obtain the new set of annotated data.

In some examples, the step 103 of acquiring the set of newly added annotated data containing the new set of annotated data may be, but not limited to be, implemented in any of the following schemes.

Scheme B1: The set of newly added annotated data may be received from an annotation platform.

In Scheme B1, the set of newly added annotated data may be retrieved from the annotation platform by transmitting a data request to the annotation platform. Alternatively, the set of newly added annotated data may be transmitted by the annotation platform actively. The present disclosure is not limited to either of these cases.

Scheme B2: The set of newly added annotated data may be retrieved from an annotation database.

In Scheme B2, all sets of annotated data that have been annotated may be stored manually or by the platform in the predetermined annotation database and the required set of annotated data may be retrieved from the annotation database by other applications/programs.

Figure 3:
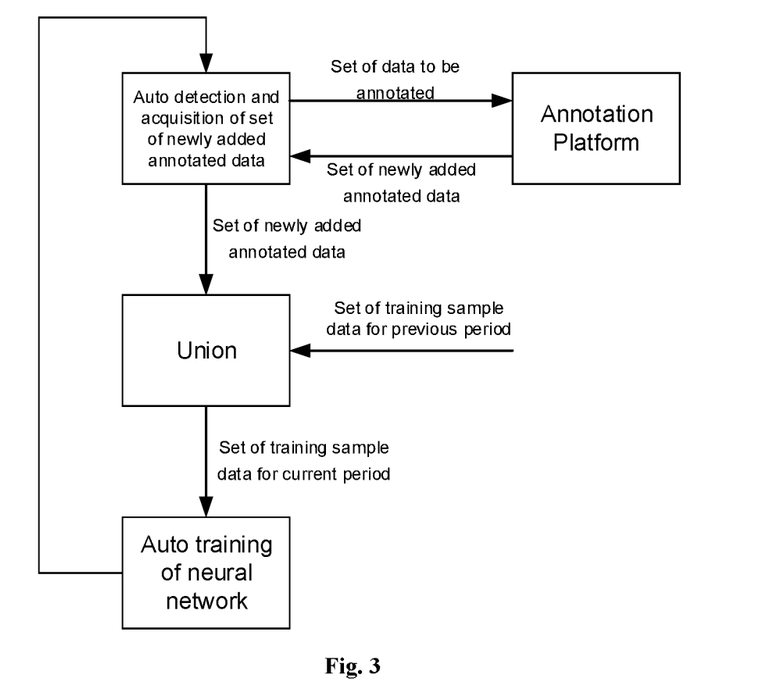
FIG. 3 is a first schematic diagram showing a process for automatically training a neural network according to some embodiments of the present disclosure.
Figure 4:
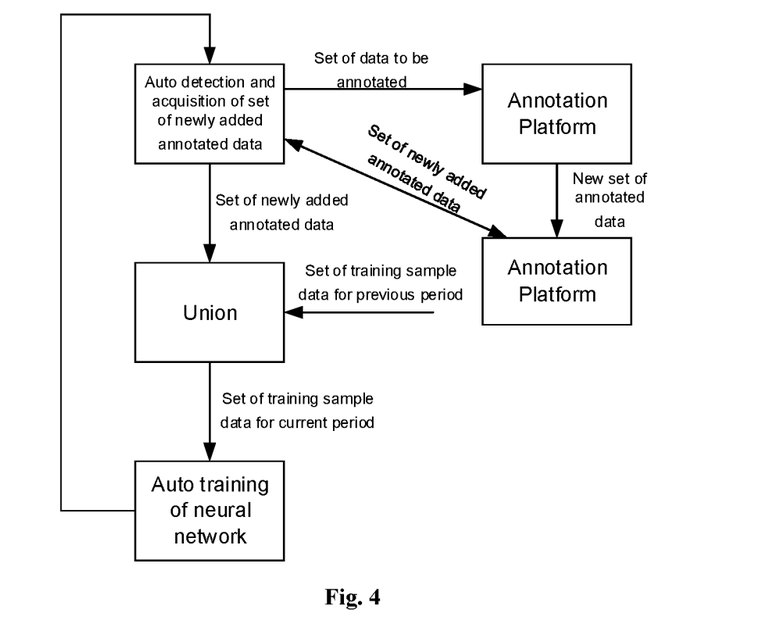
FIG. 4 is a second schematic diagram showing a process for automatically training a neural network according to some embodiments of the present disclosure.

The automatic training of the neural network may be performed in accordance with the schematic diagram of FIG. 3 when Scheme B1 is used, or in accordance with the schematic diagram of FIG. 4 when Scheme B2 is used.

In some embodiments of the present disclosure, the set of newly added annotated data may contain the new set of annotated data only, or the new set of annotated data and other sets of annotated data suitable for training the neural network. The present disclosure is not limited to either of these cases.

For Scheme B2, in some examples, it is assumed that the set of newly added annotated data contains the new set of annotated data only. Assuming that the set of data to be annotated corresponds to a unique identification (ID) number and the new set of annotated data obtained by the annotation platform annotating the set of data to be annotated has the same ID number. The annotation platform stores the new set of annotated data in the annotation database in which each set of annotated data corresponds to a unique ID number. The set of newly added annotated data may be retrieved from the annotation database by selecting from the annotation database the set of annotated data having the same ID number as the set of data to be annotated and adding the selected set of annotated data to the set of newly added annotated data.

For Scheme B2, in some examples, it is assumed that the set of newly added annotated data contains the new set of annotated data and other sets of annotated data suitable for training the neural network. Assuming that each set of annotated data in the annotation database corresponds to a unique label and a unique ID number, the set of newly added annotated data may be retrieved from the annotation database by: selecting from the annotation database sets of annotated data having their respective labels matching the label of the neural network; and for each of the selected sets of annotated data, comparing the ID number of that set of annotated data with the ID number of each set of sample data in the set of training sample data for training the neural network in the previous period and adding that set of annotated data to the set of newly added annotated data when they are inconsistent with each other.

Figure 5:
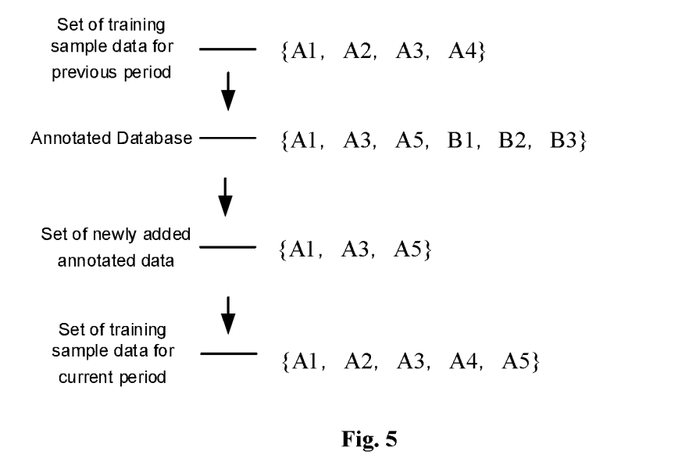
FIG. 5 is a schematic diagram showing a process for acquiring a set of newly added annotated data according to some embodiments of the present disclosure.

As shown in FIG. 5, it is assumed that the set of training sample data for training the neural network in the previous period contains four sets of sample data having ID numbers of A1, A2, A3 and A4, respectively. The annotation database contains six sets of annotated data having ID numbers of A1, A3, A5, B1, B2 and B3, respectively, among which the sets of annotated data having respective ID numbers of A1, A3 and A5 have their respective labels matching the label of the neural network. For each of the sets of annotated data having respective ID numbers of A1, A3 and A5, its ID number is compared with the ID number of each of the four sets of sample data contained in the set of training sample data for the previous period, and if its ID number is inconsistent with any of the ID numbers of the four sets of sample data, the set of annotated data is added to the set of newly added annotated data. For example, the set of annotated data having the ID number of A5 is inconsistent with any of the ID numbers of the four sets of sample data contained in the set of training sample data for the previous period, and thus it is added to the set of newly added annotated data. In this way, the resulting set of newly added annotated data is a set containing the sets of annotated data having the ID numbers of A1, A3 and A5, respectively, and the resulting set of training sample data for the current period is a union of the sets of annotated data having the ID numbers of A1, A2, A3, A4 and A5, respectively.

According to the embodiments of the present disclosure, in each period, a set of newly added annotated data is automatically acquired and stored in the set of training sample data for the neural network, such that the set of training sample data for training the neural network may be continuously expanded and enriched. The neural network may be trained based on the set of training sample data containing more and more data, such that the trained neural network may be more accurate and the accuracy of the neural network may be gradually improved.

A basic neural network model used for the above neural network shown in FIGS. 1 and 2, i.e., the neural network used when the first period starts, may be a basic neural network model selected from a set of predetermined neural network models that corresponds to a function expected to be achieved by the trained neural network, such as image segmentation, object detection, face recognition, natural language processing or the like. Alternatively, the basic neural network model may be a basic neural network model created based on the function expected to be achieved by the trained neural network. The present disclosure is not limited to any specific structure of the neural network.

The present disclosure is not limited to any specific scheme for training the neural network iteratively based on the set of training sample data for the current period in the above step 104. The training may be performed in any existing iterative training scheme.

In some embodiments of the present disclosure, in order to further improve the running speed of the neural network trained in the above step 104, one scheme is to prune the neural network trained in each period, and another scheme is to prune the neural network while it is being trained iteratively in each period. These two schemes will be described in detail below.

Figure 6:
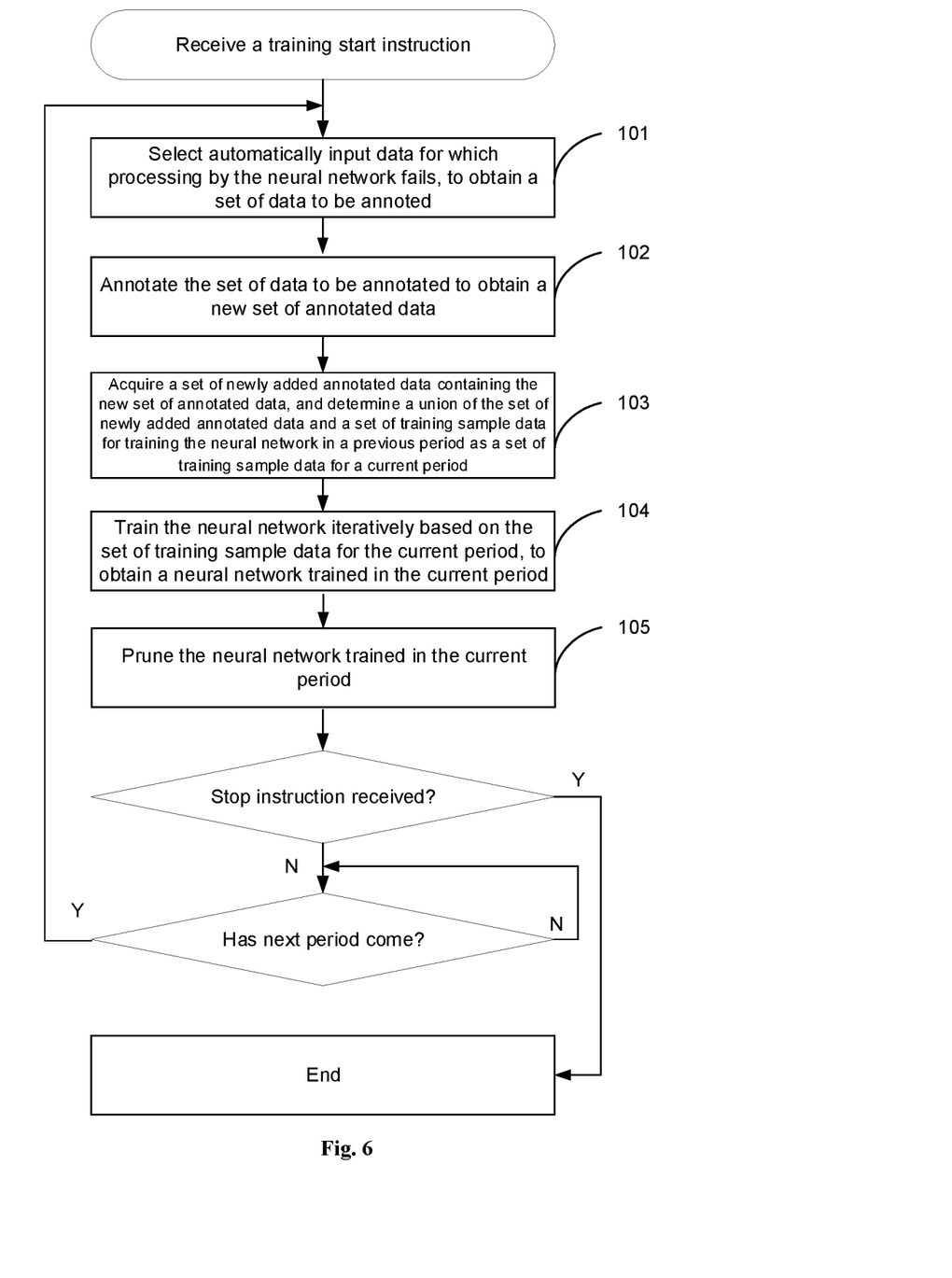
FIG. 6 is a third flowchart illustrating a method for training a neural network according to some embodiments of the present disclosure.

In the first scheme, the method may further include step 105 subsequent to the above step 104 shown in FIGS. 1 and 2, as shown in FIG. 6.

At step 105, the neural network trained in the current period is pruned.

In the second scheme, the step 104 of training the neural network iteratively based on the set of training sample data for the current period may include: training iteratively and pruning the neural network based on the set of training sample data for the current period.

The first or second scheme can be selected by those skilled in the art depending on actual requirements and the present disclosure is not limited to either of these schemes.

Based on the second scheme as described above, in order to improve the efficiency of training of the neural network and reduce the structural complexity of the trained neural network, in some embodiments of the present disclosure, a designer may create a structure of a basic neural network model. When the basic neural network model is created, each particular structure in the basic neural network model is provided with a corresponding sparse scaling operator for scaling an output from the particular structure. In each period, while the neural network having the sparse scaling operators is being trained, weights of the neural network and the sparse scaling operators are also trained based on the set of training sample data for the current period. After the training has completed, any particular structure having a sparse scaling operator of zero is removed from the trained neural network, to obtain the neural network trained in the current period. With such scheme for training the neural network, on one hand, sparse scaling operators are introduced to scale outputs from different particular structures, without adding new constraints on the weights, such that the weights and the sparse scaling operators may be optimized separately, making the subsequent optimization process simpler and easier to implement. On the other hand, a particular structure having a sparse scaling operator of zero does not contribute to the output result from the neural network. The neural network may be reduced and the running speed of the neural network may be improved by removing any particular structure having a sparse scaling operator of zero, without degrading the accuracy of the neural network.

In some embodiments, the sparse scaling operator of each particular structure has a value larger than or equal to 0. In some examples, each sparse scaling operator has an initial value close to 1, e.g., equal to 1 directly.

Thus, in some embodiments of the present disclosure, the neural network may have a plurality of particular structures each provided with a corresponding sparse scaling operator. The above step 104 may be, but not limited to, implemented in the following scheme including steps C1~C2.

At step C1, weights of the neural network and the respective sparse scaling operators for the particular structures are trained iteratively based on the set of training sample data for the current period.

At step C2, any particular structure having a sparse scaling operator of zero is removed from the trained neural network.

Here, in the step C1, the neural network may be trained iteratively using the sample data in the set of training sample data for the current period. It may be determined to stop the training when a number of training iterations has reached a threshold or when a target function associated with the neural network satisfies a predetermined convergence condition. The target function may include a loss function or a sparse regular function.

In some embodiments of the present disclosure, the step C1 may be implemented by training an initial neural network in a number of training iterations. For example, one training iteration (referred to as "the current training iteration" hereinafter), which is neither the first iteration nor the last iteration, may include the following steps D1~D3.

At step D1, the target function is optimized using a first optimization algorithm, with sparse scaling operators obtained from a previous training iteration being constants of the target function and the weights being variables of the target function, to obtain weights of a current training iteration.

At step D2, the target function is optimized using a second optimization algorithm, with the weights of the current training iteration being constants of the target function and sparse scaling operators being variables of the target function, to obtain sparse scaling operators of the current training iteration.

At step D3, a next training iteration is performed based on the weights and sparse scaling operators of the current training iteration.

The first training iteration may include: optimizing the target function using the first optimization algorithm, with initial sparse scaling operators being constants of the target function and the weights being variables of the target function, to obtain weights of a current training iteration; optimizing the target function using the second optimization algorithm, with the weights of the current training iteration being constants of the target function and sparse scaling operators being variables of the target function, to obtain sparse scaling operators of the current training iteration; and performing the second training iteration based on the weights and sparse scaling operators of the current training iteration.

The last training iteration may include: optimizing the target function using the first optimization algorithm, with sparse scaling operators obtained from a previous training iteration being constants of the target function and the weights being variables of the target function, to obtain weights of a current training iteration; optimizing the target function using the second optimization algorithm, with the weights of the current training iteration being constants of the target function and sparse scaling operators being variables of the target function, to obtain sparse scaling operators of the current training iteration; and determining a neural network containing the weights and sparse scaling operators obtained from the current training iteration as an intermediate neural network.

In some embodiments of the present disclosure, the first optimization algorithm may be, but not limited to be, any of a random gradient descent algorithm or a variant algorithm with momentum.

In some embodiments of the present disclosure, the second optimization algorithm may be, but not limited to be, an accelerated proximal gradient descent algorithm, a proximal gradient descent algorithm or an alternating direction method of multipliers.

In some embodiments of the present disclosure, the target function of the neural network may include a loss function, a weight regular function or a sparse regular function. The target function may be represented as:

$$\min_{W,\lambda}\left[\frac{1}{N}\sum_{i=1}^{N}\mathcal{L}(\mathcal{C}(x_i, W, \lambda)) + \mathcal{R}(W) + \mathcal{R}_s(\lambda)\right] \quad (1)$$

where $\mathcal{R}_s(\lambda) = \Sigma_{j=1}^{K} \gamma_j \|\lambda_j\|_1$, and

W denotes the weights of the neural network, λ denotes a vector of sparse scaling operators of the neural network, N denotes a number of pieces of sample data in the set of training sample data for the current period, $\mathcal{L}(\mathcal{C}(x_i, W, \lambda))$ denotes a loss of the neural network over sample data $x_i$, $\mathcal{R}(W)$ denotes a weight regular function, $\mathcal{R}_s(\lambda)$ denotes a sparse regular function, K denotes a number of particular structures in the neural network, $\lambda_j$ denotes a sparse scaling operator for the j-th particular structure, and $\gamma_j$ denotes a sparse penalty weight corresponding to the j-th particular structure and is calculated based on a computational complexity of the j-th particular structure.

In practice, different particular structures in the neural network may have different computational complexities. If sparsity constraints having equal weights are applied to all the particular structures, when removing particular structures subsequently, some particular structures having low computational complexities may be removed while some particular structures having high computational complexities may be retained. Therefore, in order to reduce the computational complexity of the trained neural network, in some embodiments of the present disclosure, sparsity constraints having different weights are applied to different particular structures, i.e., different sparse penalty weights are applied to the sparse scaling operators corresponding to different particular structures. In an implementation, a basic sparse penalty weight is predetermined; a computational complexity for each particular structure is calculated; and a product of the computational complexity for each particular structure and the basic sparse penalty weight is determined as the sparse penalty weight for the particular structure, as:

$$\gamma_j = \gamma_{base} \times \text{flop}_j \quad (2)$$

where $\gamma_j$ is the sparse penalty weight corresponding to the j-th particular structure, $\gamma_{base}$ is the predetermined basic sparse penalty weight and $\text{flop}_j$ is the computational complexity corresponding to the j-th particular structure.

In some embodiments of the present disclosure, the computational complexity for each particular structure may be, but not limited to be, determined in the following schemes.

Case 1: If the particular structure contains fully connected layers, the computational complexity for each fully connected layer is calculated, and a sum of the computational complexities for all the fully connected layers contained in the particular structure is determined as the computational complexity corresponding to the particular structure.

Case 2: If the particular structure contains convolutional layers, the computational complexity for each convolutional layer is calculated, and a sum of the computational complexities for all the convolutional layers contained in the particular structure is determined as the computational complexity corresponding to the particular structure.

Case 3: If the particular structure contains fully connected layers and convolutional layers, the computational complexity for each fully connected layer and the computational complexity for each convolutional layer are calculated, and a sum of the computational complexities for all the fully connected layers and convolutional layers contained in the particular structure is determined as the computational complexity corresponding to the particular structure.

In some examples, a computational complexity for a fully connected layer may be calculated as flop=N1×N2, where N1 is the number of input channels of the fully connected layer and N2 is the number of output channels of the fully connected layer.

In some examples, a computational complexity for a convolutional layer may be calculated as flop=N1×N2×H1×W1×H2×W2, where N1 is the number of input channels of the convolutional layer, N2 is the number of output channels of the convolutional layer, H1 is a height of an input feature map, W1 is a width of the input feature map, H2 is a height of a convolution kernel and W2 is a width of the convolution kernel.

In some embodiments of the present disclosure, the particular structures in the basic neural network model may be determined by a designer, e.g., as some or all of neurons in one or more network layers in the basic neural network model. Additionally or alternatively, one or more modules having the following characteristics in the basic neural network may be determined as the particular structure(s): Characteristic 1: containing one or more network layers (e.g., the particular structure containing two or more cascaded network layers); and Characteristic 2: being parallel with other modules or having cross-layer connections at two ends. Additionally or alternatively, one or more modules having the following characteristics in the basic neural network model may be determined as the particular structure(s): Characteristic 1: being a block containing one or more modules (e.g., the particular structure containing two or more parallel modules); and Characteristic 2: the block having cross-layer connections at its two ends.

In the following, detailed description will be given for the particular structures being blocks, modules and neurons.

Figures 7, 8:
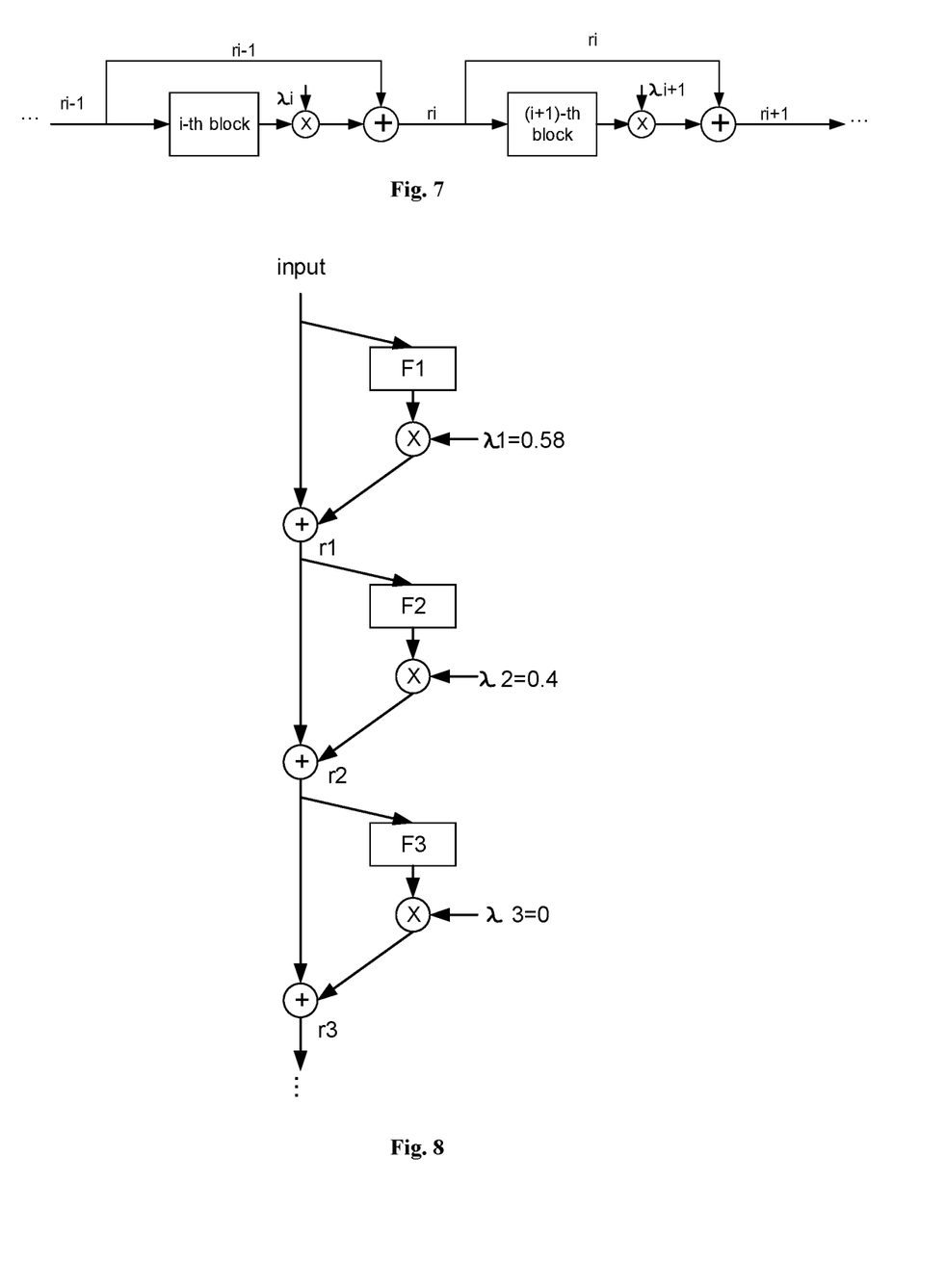
FIG. 7 is a schematic diagram showing a case where a particular structure is a block.
FIG. 8 is a schematic diagram showing a case where a particular structure is a residual block in a residual network.

As shown in FIG. 7, it is assumed that the neural network contains N blocks each corresponding to a sparse scaling operator and having cross-layer connections at its two ends.

In a specific example, assuming that the neural network is a residual network and the particular structures are residual blocks, as shown in FIG. 8, each residual block has cross-layer connections at its two ends, and the i-th residual block corresponds to a sparse scaling operator $\lambda^i$, then:

$$r^{i+1} = r^i + \lambda^i \mathcal{F}^i(r^i, W^i).$$

If the third residual block has a sparse scaling operator $\lambda^3 = 0$ after training, the third residual block $\mathcal{F}^3(r^3, W^3)$ may be removed from the residual network.

Figure 9:
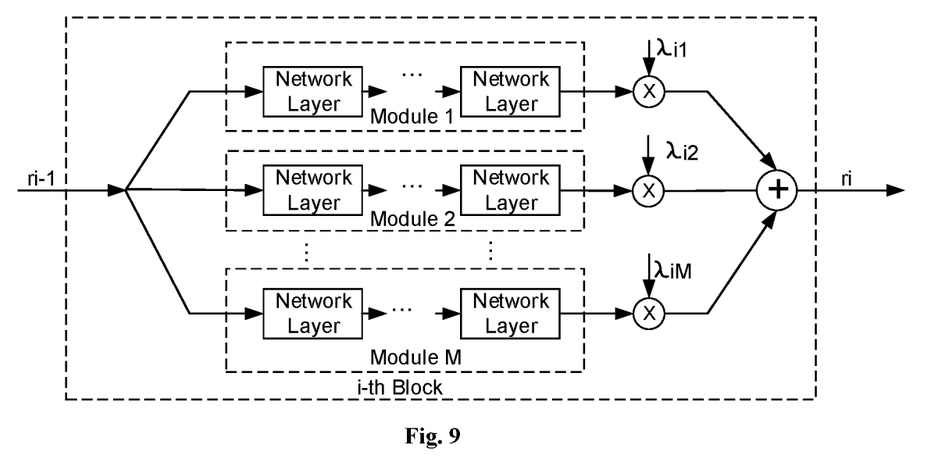
FIG. 9 is a schematic diagram showing a case where a particular structure is a module.

As shown in FIG. 9, it is assumed that the neural network contains N blocks each containing M modules. Each module contains a plurality of cascaded network layers and corresponds to a sparse scaling operator.

Figure 10:
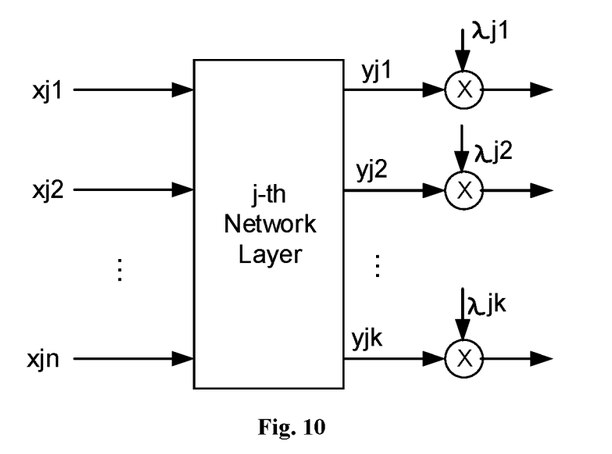
FIG. 10 is a schematic diagram showing a case where a particular structure is a neuron.

As shown in FIG. 10, assuming that the neural network contains L network layers and the l-th network layer contains k neurons, then each of the k neurons corresponds to a sparse scaling operator.

In some embodiments, in the above step 101 of selecting automatically the input data for which processing by the neural network fails, the input data for which processing by the neural network fails may be determined manually or may be checked by a preconfigured automatic checking mechanism. Alternatively, the same data as that inputted to the neural network may be processed by a teacher network having extremely high accuracy and achieving the same function as the neural network, and the processing result of the teacher network and the processing result of the neural network may be compared to select the input data for which processing by the neural network fails.

In an application scenario, according to some embodiments of the present disclosure, the neural network may be a target detection model and the input to the target detection model may be a video containing a plurality of sequences of video frames. The above step 101 of selecting automatically the input data for which processing by the neural network fails may be, but not limited to be, implemented in a scheme including the following steps.

At step E1, the video is inputted to the target detection model to obtain a detection result for each frame of image.

At step E2, the detection results for all frames of images in the video are inputted to a target tracking model to obtain a tracking result for each frame of image.

At step E3, for each frame of image in the video, the detection result and the tracking result for the frame of image are matched, and when the detection result and the tracking result for the frame of image are inconsistent with each other, the frame of image is determined as input data for which processing by the target detection model fails and the input data is determined as data to be annotated.

In some examples, in the above step E3, the detection result and the tracking result for each frame of image may be matched by using a bipartite graph matching algorithm, which may be e.g., Hungarian matching algorithm.

Alternatively, in the step E3, the detection result and the tracking result for each frame of image may be matched as follows. For each frame of image, each detection target and each tracking target may be matched in a traversal manner. For example, when a detection result of a certain frame of image includes two detection targets, A1 and A2, and the tracking result of the frame of image includes two tracking targets, B1 and B2, four pairs, A1 and B1, A1 and B2, A2 and B1, and A2 and B2, may be matched respectively. If the detection result and tracking result in each pair match each other, it is determined that the frame of image is not input data for which processing by the target detection model fails; otherwise the frame of image is determined as input data for which processing by the target detection model fails.

In some examples, the sample images determined in the step E3 may contain a plurality of neighboring frames of images which are substantially the same. In order to avoid redundancy and reduce the annotating workload, in some embodiments of the present disclosure, the method according to each of the above embodiments may further include step E4 after the matching for all the frames of images in the video has completed in the above step 103.

At step E4, the sample images determined in the step E3 may be sampled by using a temporal non-maximum suppression algorithm.

It can be appreciated by those skilled in the art that other schemes, e.g., a simple interval sampling algorithm, may be used to sample the sample images in the step E4.

Embodiment 2

Based on the same concept as the method for training a neural network according to the above Embodiment 1, in Embodiment 2 of the present disclosure, an apparatus for training a neural network is provided. The apparatus has a structure shown in FIG. 11 and includes a control unit 1, a selecting unit 2, an annotating unit 3, an acquiring unit 4 and a training unit 5.

Figure 11:
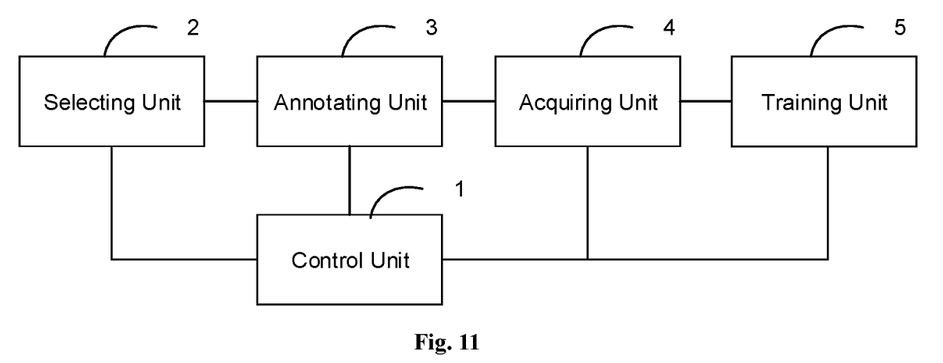
FIG. 11 is a first schematic diagram showing a structure of an apparatus for training a neural network according to some embodiments of the present disclosure.

The control unit 1 may be configured to trigger the selecting unit 2, the annotating unit 3, the acquiring unit 4 and the training unit 5 at a predetermined time period.

The selecting unit 2 may be configured to select automatically input data for which processing by the neural network fails, to obtain a set of data to be annotated.

The annotating unit 3 may be configured to annotate the set of data to be annotated to obtain a new set of annotated data.

The acquiring unit 4 may be configured to acquire a set of newly added annotated data containing the new set of annotated data, and determine a union of the set of newly added annotated data and a set of training sample data for training the neural network in a previous period as a set of training sample data for a current period.

The training unit 5 may be configured to train the neural network iteratively based on the set of training sample data for the current period, to obtain a neural network trained in the current period.

In some embodiments of the present disclosure, the annotating unit 3 may be configured to transmit the set of data to be annotated to a annotation platform, which may annotate the data in the set of data to be annotated to obtain the new set of annotated data (corresponding to the above Scheme A1 and details thereof will be omitted here). Alternatively, the set of data to be annotated may be annotated manually to obtain the new set of annotated data (corresponding to the above Scheme A2).

In some embodiments of the present disclosure, the acquiring unit 4 being configured to acquire the set of newly added annotated data containing the new set of annotated data may include the acquiring unit 4 being configured to: receive the set of newly added annotated data from a annotation platform (corresponding to Scheme B1 in Embodiment 1 and details thereof will be omitted here), or retrieve the set of newly added annotated data from a annotation database (corresponding to Scheme B2 in Embodiment 1 and details thereof will be omitted here).

In some embodiments of the present disclosure, a basic neural network model used for the neural network, i.e., the neural network used when the first period starts, may be a basic neural network model selected from a set of predetermined neural network models that corresponds to a function expected to be achieved by the trained neural network, such as image segmentation, object detection, face recognition, natural language processing or the like. Alternatively, the basic neural network model may be a basic neural network model created based on the function expected to be achieved by the trained neural network. The present disclosure is not limited to any specific structure of the neural network.

The present disclosure is not limited to any specific scheme for the above training unit 5 to train the neural network iteratively based on the set of training sample data for the current period. The training can be performed in any existing iterative training scheme.

In some embodiments of the present disclosure, in order to further improve the running speed of the neural network trained by the training unit 5, one scheme is to prune the neural network trained in each period, and another scheme is to prune the neural network while it is being trained in each period. These two schemes will be described in detail below.

Figure 12:
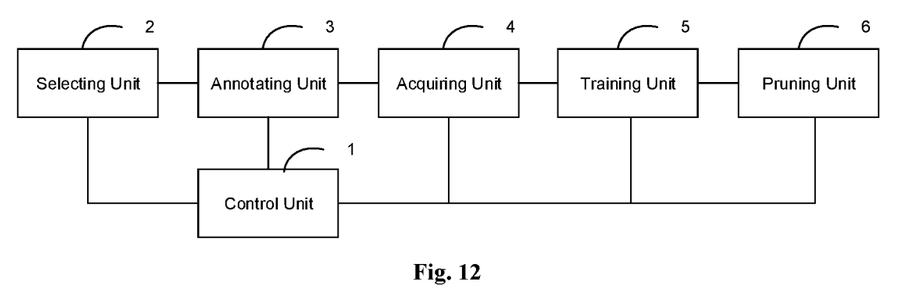
FIG. 12 is a second schematic diagram showing a structure of an apparatus for training a neural network according to some embodiments of the present disclosure.

In the first scheme, the above apparatus shown in FIG. 11 may further include a pruning unit 6, as shown in FIG. 12.

The pruning unit 6 may be configured to prune the neural network trained in the current period.

In the second scheme, the training unit 5 may be configured to: train iteratively and prune the neural network based on the set of training sample data for the current period, to obtain the neural network trained in the current period.

The first or second scheme can be selected by those skilled in the art depending on actual requirements and the present disclosure is not limited to either of these schemes.

Based on the second scheme as described above, in order to improve the efficiency of training of the neural network and reduce the structural complexity of the trained neural network, in some embodiments of the present disclosure, a designer may create a structure of a basic neural network model. When the basic neural network model is created, each particular structure in the basic neural network model is provided with a corresponding sparse scaling operator for scaling an output from the particular structure. In each period, while the neural network having the sparse scaling operators is being trained, weights of the neural network and the sparse scaling operators are also trained based on the set of training sample data for the current period. After the training has completed, any particular structure having a sparse scaling operator of zero is removed from the trained neural network, to obtain the neural network trained in the current period. With such scheme for training the neural network, on one hand, sparse scaling operators are introduced to scale outputs from different particular structures, without adding new constraints on the weights, such that the weights and the sparse scaling operators may be optimized separately, making the subsequent optimization process simpler and easier to implement. On the other hand, a particular structure having a sparse scaling operator of zero does not contribute to the output result from the neural network. The neural network may be reduced and the running speed of the neural network may be improved by removing any particular structure having a sparse scaling operator of zero, without degrading the accuracy of the neural network.

In some embodiments, the sparse scaling operator of each particular structure has a value larger than or equal to 0. Preferably, each sparse scaling operator has an initial value close to 1, e.g., equal to 1 directly.

In some embodiments of the present disclosure, the neural network may have a plurality of particular structures each provided with a corresponding sparse scaling operator for scaling an output from the particular structure. The training unit 5 may include: a training sub-unit configured to train iteratively weights of the neural network and the respective sparse scaling operators for the particular structures based on the set of training sample data for the current period, and trigger a removing sub-unit when the iterative training has completed; and the removing sub-unit configured to remove any particular structure having a sparse scaling operator of zero from the neural network trained by the training sub-unit, to obtain the neural network trained in the current period.

In some embodiments of the present disclosure, the training sub-unit may be configured to: train iteratively the neural network using the sample data in the set of training sample data for the current period; determine to stop the training when a number of training iterations has reached a threshold or when a target function associated with the neural network satisfies a predetermined convergence condition. The target function may include a loss function or a sparse regular function.

The training sub-unit being configured to train iteratively the neural network using the sample data in the set of training sample data for the current period may include the training sub-unit being configured to: train the neural network in a number of training iterations by: optimizing the target function using a first optimization algorithm, with sparse scaling operators obtained from a previous training iteration being constants of the target function and the weights being variables of the target function, to obtain weights of a current training iteration; optimizing the target function using a second optimization algorithm, with the weights of the current training iteration being constants of the target function and sparse scaling operators being variables of the target function, to obtain sparse scaling operators of the current training iteration; and performing a next training iteration based on the weights and sparse scaling operators of the current training iteration.

The first training iteration may include: optimizing the target function using the first optimization algorithm, with initial sparse scaling operators being constants of the target function and the weights being variables of the target function, to obtain weights of a current training iteration; optimizing the target function using the second optimization algorithm, with the weights of the current training iteration being constants of the target function and sparse scaling operators being variables of the target function, to obtain sparse scaling operators of the current training iteration; and performing the second training iteration based on the weights and sparse scaling operators of the current training iteration.

The last training iteration may include: optimizing the target function using the first optimization algorithm, with sparse scaling operators obtained from a previous training iteration being constants of the target function and the weights being variables of the target function, to obtain weights of a current training iteration; optimizing the target function using the second optimization algorithm, with the weights of the current training iteration being constants of the target function and sparse scaling operators being variables of the target function, to obtain sparse scaling operators of the current training iteration; and determining a neural network containing the weights and sparse scaling operators obtained from the current training iteration as an intermediate neural network.

In some embodiments of the present disclosure, the first optimization algorithm may be, but not limited to be, any of a random gradient descent algorithm or a variant algorithm with momentum.

In some embodiments of the present disclosure, the second optimization algorithm may be, but not limited to be, an accelerated proximal gradient descent algorithm, a proximal gradient descent algorithm or an alternating direction method of multipliers.

In some embodiments of the present disclosure, the target function may be set according to Equation (1) in Embodiment 1, and details thereof will be omitted here.

In practice, different particular structures in the neural network may have different computational complexities. If sparsity constraints having equal weights are applied to all the particular structures, when removing particular structures subsequently, some particular structures having low computational complexities may be removed while some particular structures having high computational complexities may be retained. Therefore, in order to reduce the computational complexity of the trained neural network, in some embodiments of the present disclosure, sparsity constraints having different weights are applied to different particular structures, i.e., different sparse penalty weights are applied to the sparse scaling operators corresponding to different particular structures. In an implementation, a basic sparse penalty weight is predetermined; a computational complexity for each particular structure is calculated; and a product of the computational complexity for each particular structure and the basic sparse penalty weight is determined as the sparse penalty weight for the particular structure. For further details, reference can be made to relevant content in Embodiment 1 and description thereof will be omitted here.

Preferably, in some embodiments of the present disclosure, for details of implementation of the selecting unit 2, reference can be made to content relevant to the step 101 in Embodiment 1 and description thereof will be omitted here.

Embodiment 3

Figure 13:
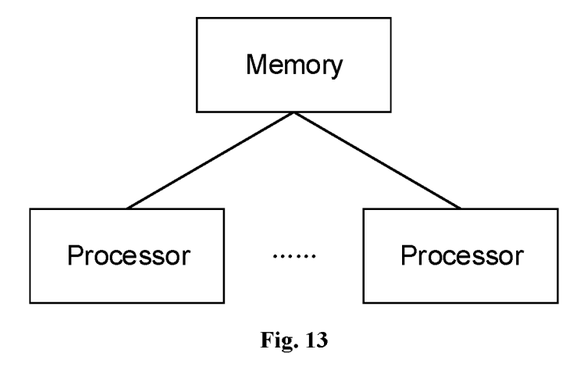
FIG. 13 is a schematic diagram showing a structure of a computer server according to some embodiments of the present disclosure.

According to Embodiment 3 of the present disclosure, a computer server is provided. As shown in FIG. 13, the computer server includes a memory and one or more processors communicatively connected to the memory.

The memory stores instructions executable by the one or more processors. The instructions, when executed by the one or more processors, cause the one or more processors to perform any method for training a neural network according to the above Embodiment 1.

In Embodiment 3 of the present disclosure, the computer server can be a hardware device such as a Personal Computer (PC), a notebook computer, a tablet, a Field Programmable Gate Array (FPGA), an industrial computer or a smart phone.

The basic principles of the present disclosure have been described above with reference to the embodiments. However, it can be appreciated by those skilled in the art that all or any of the steps or components of the method or apparatus according to the present disclosure can be implemented in hardware, firmware, software or any combination thereof in any computing device (including a processor, a storage medium, etc.) or a network of computing devices. This can be achieved by those skilled in the art using their basic programing skills based on the description of the present disclosure.

It can be appreciated by those skilled in the art that all or part of the steps in the method according to the above embodiment can be implemented in hardware following instructions of a program. The program can be stored in a computer readable storage medium. The program, when executed, may include one or any combination of the steps in the method according to the above embodiment.

Further, the functional units in the embodiments of the present disclosure can be integrated into one processing module or can be physically separate, or two or more units can be integrated into one module. Such integrated module can be implemented in hardware or software functional units. When implemented in software functional units and sold or used as a standalone product, the integrated module can be stored in a computer readable storage medium.

It can be appreciated by those skilled in the art that the embodiments of the present disclosure can be implemented as a method, a system or a computer program product. The present disclosure may include pure hardware embodiments, pure software embodiments and any combination thereof. Also, the present disclosure may include a computer program product implemented on one or more computer readable storage mediums (including, but not limited to, magnetic disk storage and optical storage) containing computer readable program codes.

The present disclosure has been described with reference to the flowcharts and/or block diagrams of the method, device (system) and computer program product according to the embodiments of the present disclosure. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by a processor of a computer or any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute a manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

While the embodiments of the present disclosure have described above, further alternatives and modifications can be made to these embodiments by those skilled in the art in light of the basic inventive concept of the present disclosure. The claims as attached are intended to cover the above embodiments and all these alternatives and modifications that fall within the scope of the present disclosure.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

What is claimed is:

1. A method for training a neural network, comprising the following process performed at a predetermined time period:

selecting input data automatically to obtain a set of data to be annotated, wherein a video containing a plurality of sequences of frames is inputted to the neural network to obtain a target detection result for each frame of image, wherein target detection results for all frames of images in the video are inputted to a target tracking model to obtain a tracking result for each frame of image, and wherein the frame of image is determined as the input data in response to that the target detection result and the tracking result for a frame of image are inconsistent with each other;

annotating the set of data to be annotated to obtain a new set of annotated data;

acquiring a set of newly added annotated data containing the new set of annotated data;

determining a union of the set of newly added annotated data and a set of training sample data for training the neural network in a previous period as a set of training sample data for a current period;

training the neural network iteratively, based on the set of training sample data for the current period, to obtain a neural network trained in the current period, wherein the neural network has a plurality of particular structures each provided with a corresponding sparse scaling operator for scaling an output from the particular structure, wherein sparsity constraints having different weights are applied to the particular structures based on different computational complexities of the particular structures; and training the neural network iteratively using a sample data in the set of training sample data for the current period comprises training the neural network in a number of training iterations by:

optimizing a target function using a first optimization algorithm, with sparse scaling operators obtained from a previous training iteration being constants of the target function and the weights being variables of the target function, to obtain weights of a current training iteration;

optimizing the target function using a second optimization algorithm, with the weights of the current training iteration being constants of the target function and sparse scaling operators being variables of the target function, to obtain sparse scaling operators of the current training iteration; and performing a next training iteration based on the weights and sparse scaling operators of the current training iteration.

2. The method of claim 1, wherein said acquiring the set of newly added annotated data containing the new set of annotated data comprises:

receiving the set of newly added annotated data from an annotation platform, or retrieving the set of newly added annotated data from an annotation database.

3. The method of claim 1, further comprising, subsequent to obtaining the neural network trained in the current period:

pruning the neural network trained in the current period.

4. The method of claim 1, wherein said training the neural network iteratively, based on the set of training sample data for the current period comprises:

training iteratively and pruning the neural network based on the set of training sample data for the current period.

5. The method of claim 4, wherein said training iteratively and pruning the neural network based on the set of training sample data for the current period comprises:

training iteratively weights of the neural network and the respective sparse scaling operators for the particular structures based on the set of training sample data for the current period, and removing any particular structure having a sparse scaling operator of zero from the trained neural network.

6. The method of claim 5, wherein said training iteratively the weights of the neural network and the respective sparse scaling operators for the particular structures based on the set of training sample data for the current period comprises determining to stop the training when a number of training iterations has reached a threshold or when a target function associated with the neural network satisfies a predetermined convergence condition, wherein the target function comprises a loss function or a sparse regular function.

7. The method of claim 1, wherein the target function is:

$$\min_{W,\lambda}\left[\frac{1}{N}\sum_{i=1}^{N}\mathcal{L}(\mathcal{C}(x_i, W, \lambda)) + \mathcal{R}(W) + \mathcal{R}_s(\lambda)\right]$$

where $\mathcal{R}_s(\lambda)=\Sigma_{j=1}^{K}\gamma_j\|\lambda_j\|_1$, and

W denotes the weights of the neural network, $\lambda$ denotes a vector of sparse scaling operators of the neural network, N denotes a number of pieces of sample data in the set of training sample data for the current period, $\mathcal{L}(\mathcal{C}(x_i, W, \lambda))$ denotes a loss of the neural network over sample data $x_i$, $\mathcal{R}(W)$ denotes a weight regular function, $\mathcal{R}_s(\lambda)$ denotes a sparse regular function, K denotes a number of particular structures in the neural network, $\lambda_j$ denotes a sparse scaling operator for the j-th particular structure, and $\gamma_j$ denotes a sparse penalty weight corresponding to the j-th particular structure and is calculated based on a computational complexity of the j-th particular structure.

8. An apparatus for training a neural network, comprising:
a control unit configured to trigger a selecting unit, an annotating unit, an acquiring unit and a training unit at a predetermined time period;
the selecting unit configured to select input data automatically to obtain a set of data to be annotated, wherein a video containing a plurality of sequences of frames is inputted to the neural network to obtain a target detection result for each frame of image, wherein target detection results for all frames of images in the video are inputted to a target tracking model to obtain a tracking result for each frame of image, and wherein the frame of image is determined as the input data in response to that the target detection result and the tracking result for a frame of image are inconsistent with each other;
the annotating unit configured to annotate the set of data to be annotated to obtain a new set of annotated data;
the acquiring unit configured to:
acquire a set of newly added annotated data containing the new set of annotated data; and
determine a union of the set of newly added annotated data and a set of training sample data for training the neural network in a previous period as a set of training sample data for a current period; and
the training unit configured to train the neural network iteratively, based on the set of training sample data for the current period, to obtain a neural network trained in the current period, wherein the neural network has a plurality of particular structures each provided with a corresponding sparse scaling operator for scaling an output from the particular structure, wherein sparsity constraints having different weights are applied to the particular structures based on different computational complexities of the particular structures,
wherein training unit comprises a training sub-unit that is configured to train the neural network iteratively using a sample data in the set of training sample data for the current period, the training sub-unit further configured to train the neural network in a number of training iterations by:
optimizing a target function using a first optimization algorithm, with sparse scaling operators obtained from a previous training iteration being constants of the target function and the weights being variables of the target function, to obtain weights of a current training iteration;
optimizing the target function using a second optimization algorithm, with the weights of the current training iteration being constants of the target function and sparse scaling operators being variables of the target function, to obtain sparse scaling operators of the current training iteration; and
performing a next training iteration based on the weights and sparse scaling operators of the current training iteration.

9. The apparatus of claim 8, wherein the acquiring unit being configured to acquire the set of newly added annotated data containing the new set of annotated data comprises the acquiring unit being configured to:
receive the set of newly added annotated data from an annotation platform, or
retrieve the set of newly added annotated data from an annotation database.

10. The apparatus of claim 8, further comprising:
a pruning unit configured to prune the neural network trained in the current period.

11. The apparatus of claim 8, wherein the training unit is configured to:
train iteratively and prune the neural network based on the set of training sample data for the current period, to obtain the neural network trained in the current period.

12. The apparatus of claim 8, wherein the training unit comprises:
the training sub-unit that is configured to train iteratively weights of the neural network and the respective sparse scaling operators for the particular structures based on the set of training sample data for the current period, and trigger a removing sub-unit when the iterative training has completed; and
the removing sub-unit configured to remove any particular structure having a sparse scaling operator of zero from the neural network trained by the training sub-unit, to obtain the neural network trained in the current period.

13. The apparatus of claim 12, wherein the training sub-unit is configured to
determine to stop the training when a number of training iterations has reached a threshold or when a target function associated with the neural network satisfies a predetermined convergence condition, wherein the target function comprises a loss function or a sparse regular function.

14. The apparatus of claim 8, wherein the target function is:

$$\min_{W,\lambda}\left[\frac{1}{N}\sum_{i=1}^{N}\mathcal{L}(\mathcal{C}(x_i, W, \lambda)) + \mathcal{R}(W) + \mathcal{R}_s(\lambda)\right]$$

where $\mathcal{R}_s(\lambda)=\Sigma_{j=1}^{K}\gamma_j\|\lambda_j\|_1$, and

W denotes the weights of the neural network, $\lambda$ denotes a vector of sparse scaling operators of the neural network, N denotes a number of pieces of sample data in the set of training sample data for the current period, $\mathcal{L}(\mathcal{C}(x_i, W, \lambda))$ denotes a loss of the neural network over sample data $x_i$, $\mathcal{R}(W)$ denotes a weight regular function, $\mathcal{R}_s(\lambda)$ denotes a sparse regular function, K denotes a number of particular structures in the neural network, $\lambda_j$ denotes a sparse scaling operator for the j-th particular structure, and $\gamma_j$ denotes a sparse penalty weight corresponding to the j-th particular structure and is calculated based on a computational complexity of the j-th particular structure.

15. A computer server, comprising a memory and one or more processors communicatively connected to the memory, the memory storing instructions executable by the one or more processors, the instructions, when executed by the one or more processors, causing the one or more processors to perform a method comprising:

selecting input data automatically to obtain a set of data to be annotated, wherein a video containing a plurality of sequences of frames is inputted to a neural network to obtain a target detection result for each frame of image, wherein target detection results for all frames of images in the video are inputted to a target tracking model to obtain a tracking result for each frame of image, and wherein the frame of image is determined as the input data in response to that the target detection result and the tracking result for a frame of image are inconsistent with each other;

annotating the set of data to be annotated to obtain a new set of annotated data;

acquiring a set of newly added annotated data containing the new set of annotated data, and determining a union of the set of newly added annotated data and a set of training sample data for training the neural network in a previous period as a set of training sample data for a current period;

training the neural network iteratively, based on the set of training sample data for the current period, to obtain a neural network trained in the current period, wherein the neural network has a plurality of particular structures each provided with a corresponding sparse scaling operator for scaling an output from the particular structure, wherein sparsity constraints having different weights are applied to the particular structures based on different computational complexities of the particular structures; and training the neural network iteratively using a sample data in the set of training sample data for the current period comprises training the neural network in a number of training iterations by:

optimizing a target function using a first optimization algorithm, with sparse scaling operators obtained from a previous training iteration being constants of the target function and the weights being variables of the target function, to obtain weights of a current training iteration;

optimizing the target function using a second optimization algorithm, with the weights of the current training iteration being constants of the target function and sparse scaling operators being variables of the target function, to obtain sparse scaling operators of the current training iteration; and performing a next training iteration based on the weights and sparse scaling operators of the current training iteration.

16. The computer server of claim 15, wherein the acquiring the set of newly added annotated data containing the new set of annotated data comprises:

receiving the set of newly added annotated data from an annotation platform, or retrieving the set of newly added annotated data from an annotation database.

17. The computer server of claim 15, wherein the method further comprises, subsequent to obtaining the neural network trained in the current period:

pruning the neural network trained in the current period.

18. The computer server of claim 15, wherein said training the neural network iteratively, based on the set of training sample data for the current period comprises:

training iteratively and pruning the neural network based on the set of training sample data for the current period.

* * * * *